April 13, 1943. F. J. SHOOK 2,316,369
TIRE-BUILDING APPARATUS
Filed Jan. 18, 1939 5 Sheets-Sheet 1

INVENTOR
FLORAIN J. SHOOK
BY
*Ralph Barrow*
ATTORNEY

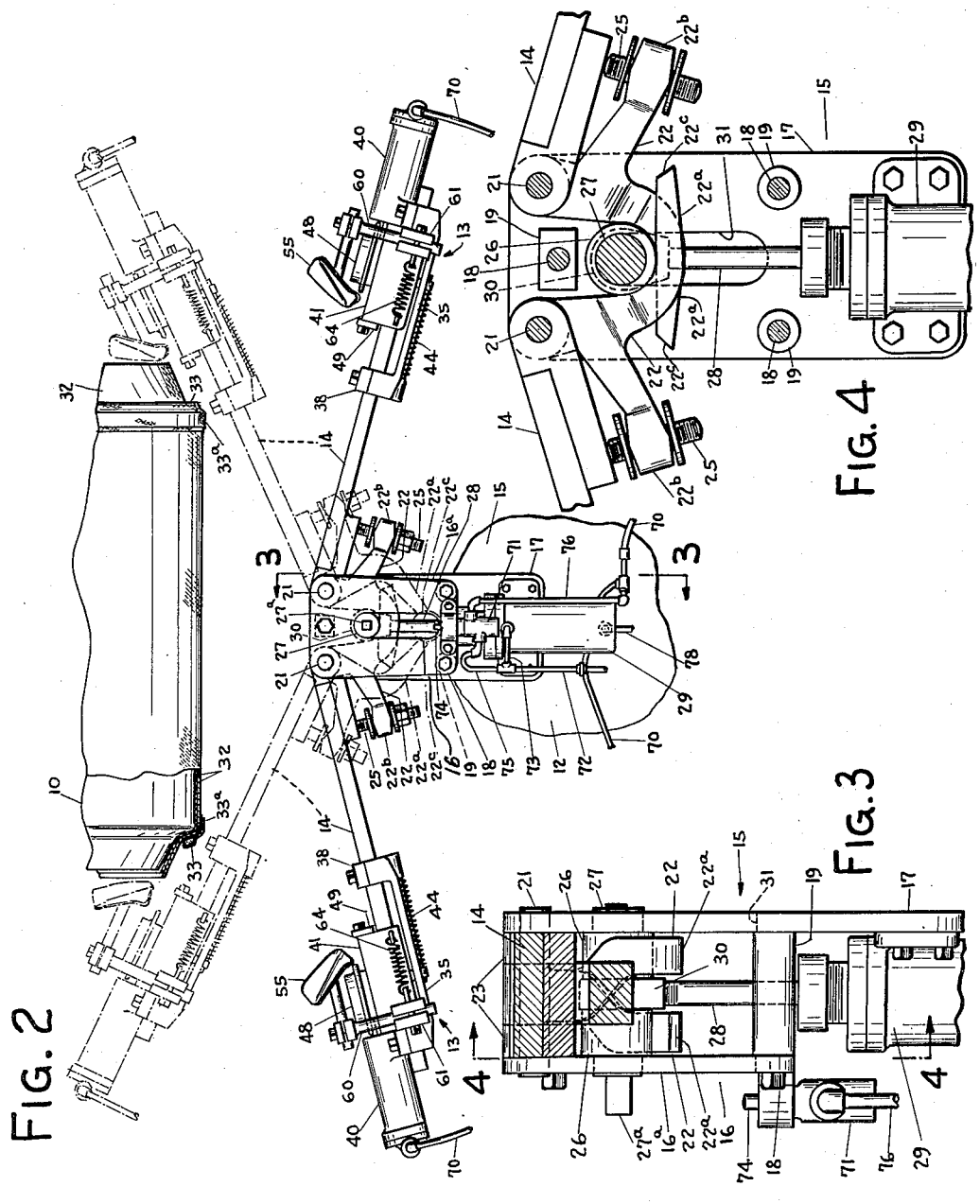

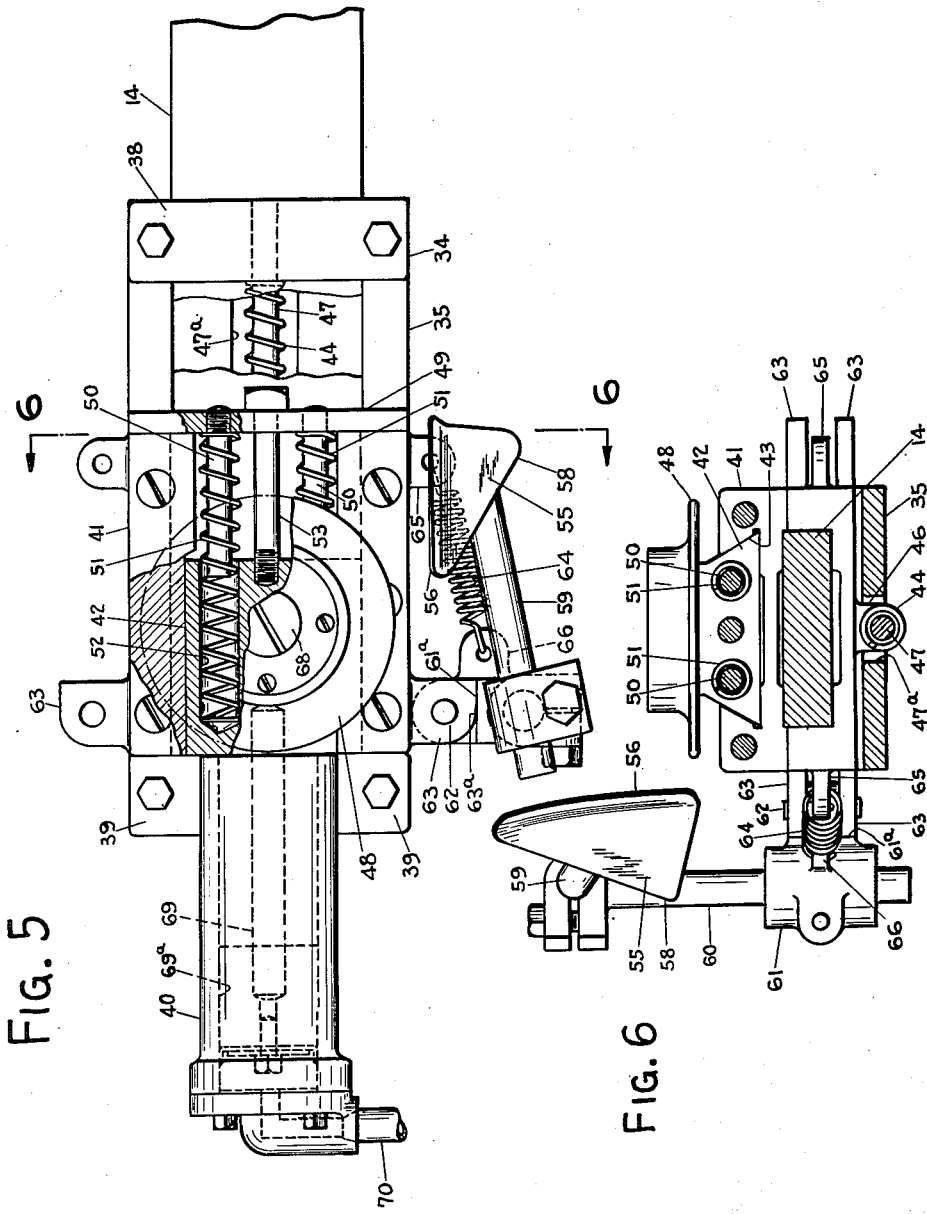

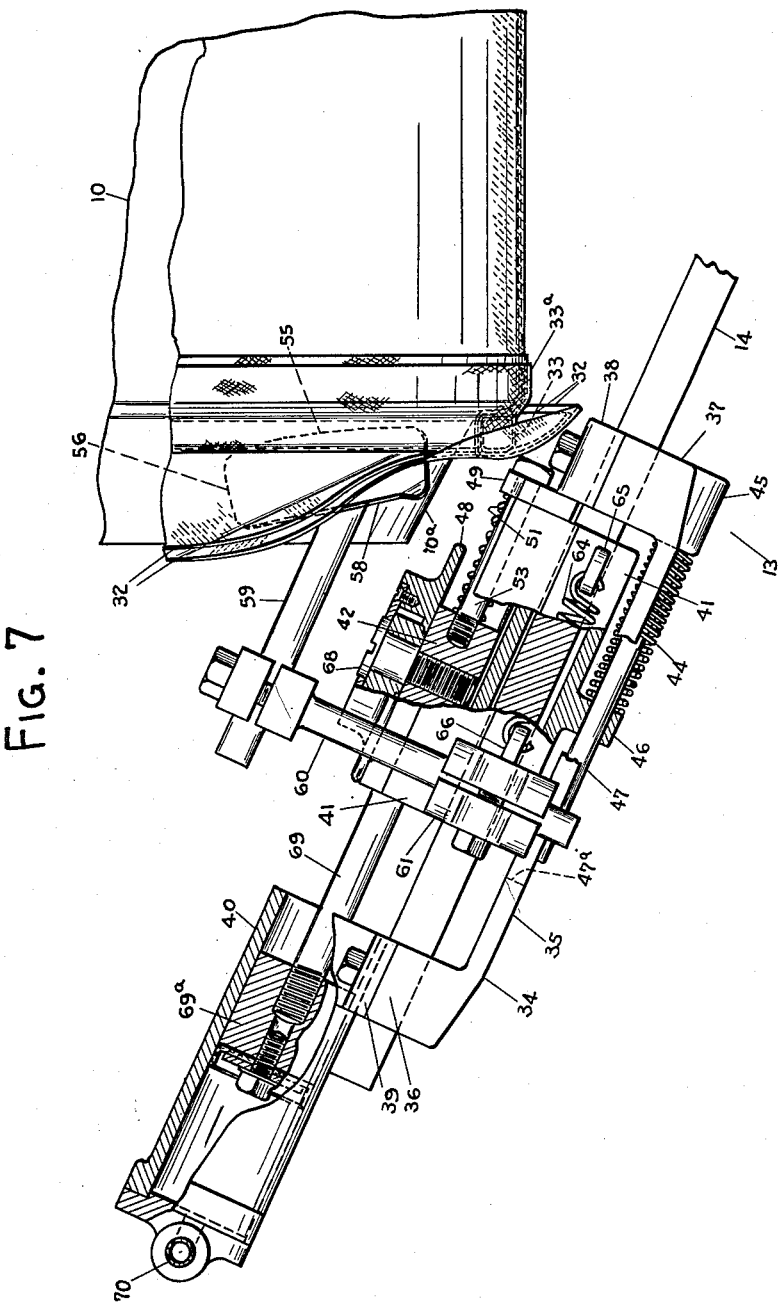

April 13, 1943. F. J. SHOOK 2,316,369
TIRE-BUILDING APPARATUS
Filed Jan. 18, 1939 5 Sheets-Sheet 5
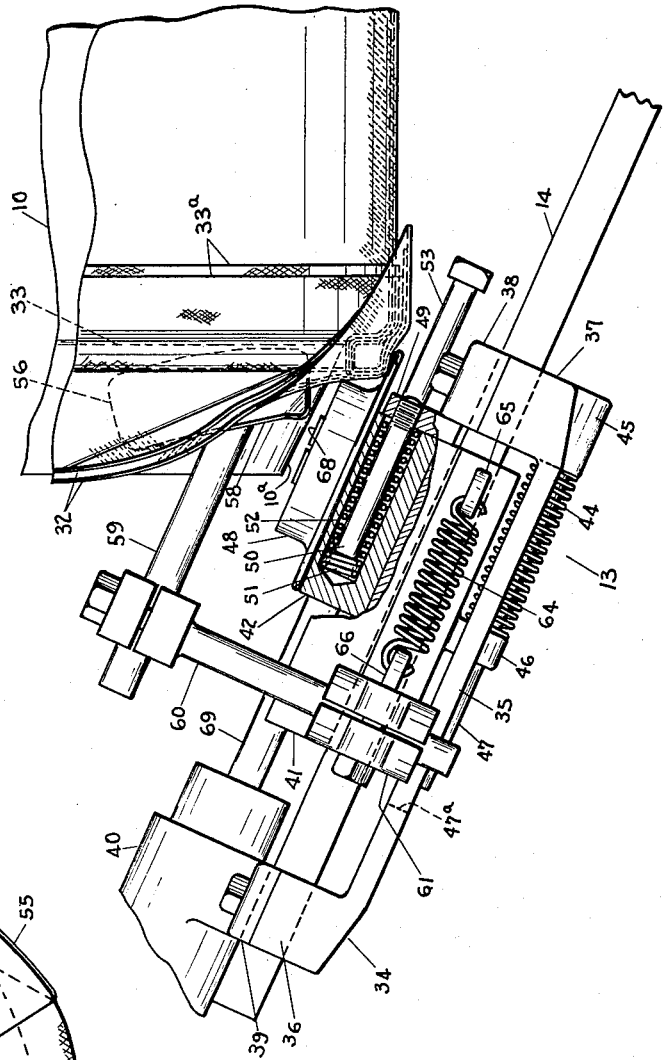
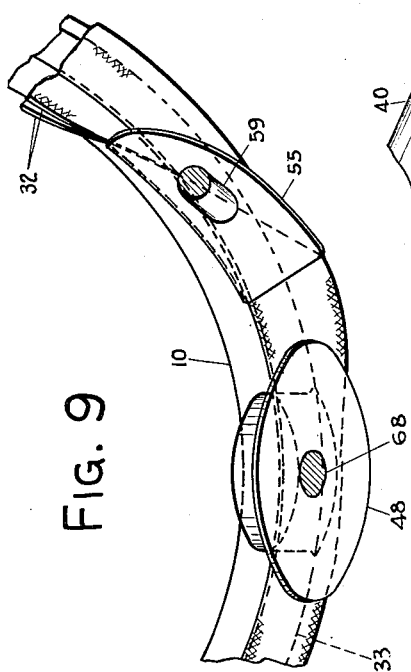
INVENTOR
FLORAIN J. SHOOK
BY
Ralph Barrow,
ATTORNEY Patented Apr. 13, 1943

2,316,369

UNITED STATES PATENT OFFICE 2,316,369

TIRE-BUILDING APPARATUS

Florain J. Shook, Akron, Ohio, assignor to National Rubber Machinery Company, Akron, Ohio, a corporation of Ohio Application January 18, 1939, Serial No. 251,494

8 Claims. (Cl. 154—10)

This invention relates to tire-building machines, and in particular relates to apparatus for stitching the fabric plies of a tire carcass about the bead regions thereof.

A general object of the invention is to provide, in a tire-building machine, apparatus for automatically stitching the fabric plies about the bead portions of the tire.

A particular object of the invention is to provide automatic means of the character described for building pneumatic tires by the flat-band method in an improved, effective, and more facile manner.

These and other objects of the invention will be manifest from the following brief description and the accompanying drawings.

Of the accompanying drawings:

Figure 2 is a side elevation, taken substantially on line 2—2 of Figure 1, of the stitcher mechanism embodying the invention.

Figure 3 is a cross section on line 3—3 of Figure 2.

Figure 4 is a fragmentary section on line 4—4 of Figure 3.

Figure 5 is a plan view of one of the bead-stitching mechanisms.

Figure 6 is a cross-section taken on line 6—6 of Figure 5.

Figure 7 is a fragmentary side elevation, partly broken away and in section, of a bead-stitching mechanism in an intermediate operative position for turning the fabric layers about the bead.

Figure 8 is a view, similar to Figure 7, showing the bead-stitching mechanism in its final operative position.

Figure 9 is a fragmentary end view, partly broken away and in section, showing the final turn-up operation performed in Figure 8.

Figure 1:
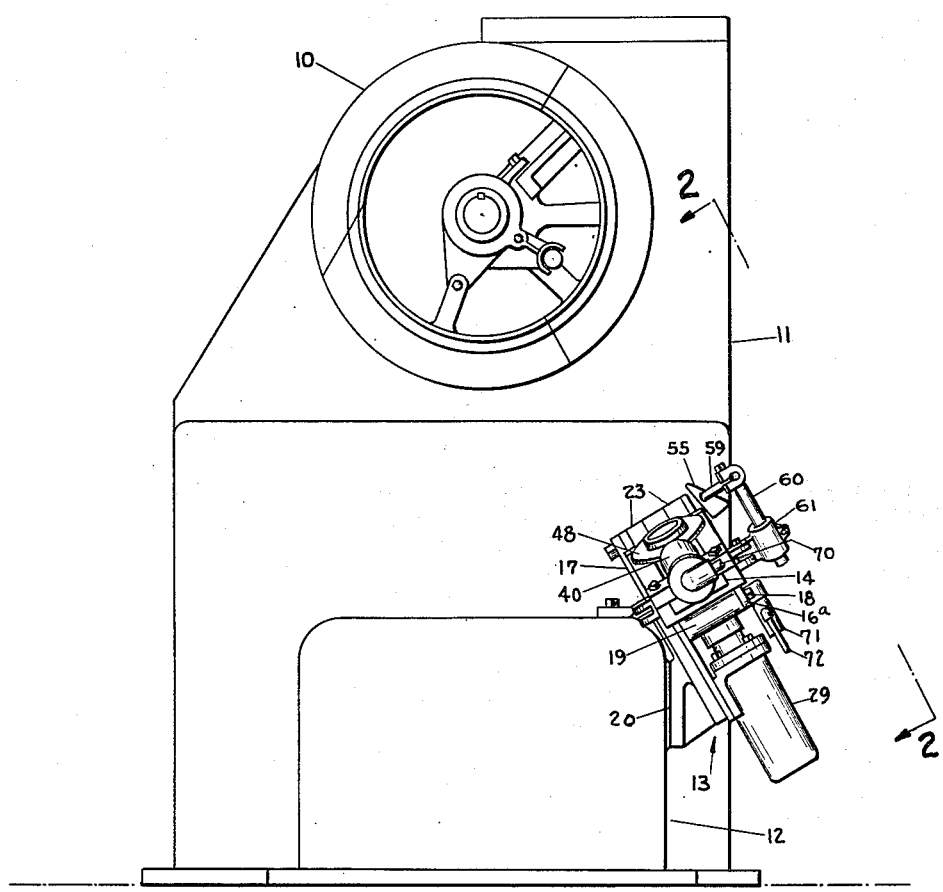
Figure 1 is an end elevation of a tire-building machine with apparatus embodying the invention shown in association with the drum thereof.

Referring to the drawings, 10 is annular collapsible drum, of the type used for building flat-band type pneumatic tires, said drum being rotatably supported on a frame 11, mounted on a base 12. The drum 10 may be rotatably driven in either direction by a suitable known mechanism (not shown).

As shown in Figures 1, 2, 3 and 4, the apparatus for stitching the fabric plies of a tire carcass about the bead portions thereof may comprise bead-stitcher mechanisms, indicated generally at 13, 13, carried by a pair of pivotally mounted lever-arms 14, 14, and lever-operating mechanism indicated at 15.

As best shown in Figures 2, 3, and 4, the lever-operating mechanism 15 may be supported in a frame 16, suitably located beneath drum 10 at a point intermediate the sides thereof, comprising a plate 16ª secured in spaced relation to a back plate 17 by means of bolts 18, 18 and spacers 19, 19, back plate 17 being mounted on a bracket 20 on base 12. Lever-arms 14 may be pivotally mounted centrally between plates 16ª and 17, on pins 21, 21, and normally extend outwardly and downwardly in oppositely disposed directions to hold the bead-stitching mechanisms on the free ends thereof, out of bead-stitching engagement with the sides of drum 10. For swinging the lever-arms 14 on pins 21, a pair of substantially L-shaped elements 22, 22, may be pivotally mounted on the pins 21, these elements preferably being bifurcated at 23 to be engaged between the centrally disposed arm 14 and the plates 16ª and 17 of frame 16. Downwardly extending shanks 22ª, 22ª, of elements 22 may have outwardly extending lugs 22ᵇ, 22ᵇ, thereon for receiving adjustable screws 25, 25 against which arms 14 rest by gravity. In the inoperative position of arms 14 (see Figure 4) the inner faces of shanks 22 engage against opposite sides of rollers 26, 26 on a pin 27 carried by a plunger-rod 28, preferably reciprocally operable at will by a cylinder 29 carried by back-plate 17. For guiding the rollers 26 in a vertical direction, rollers or collars 30, 30, may be provided on the pin 27 for engagement in slots 31, 31, in plates 16ª and 17.

Inwardly extending, oppositely disposed, end portions or fingers 22ᶜ of the L-shaped elements 22 may be engaged under the respective rollers 26, in the inoperative position of the arms 14. Downward movement of plunger-rod 28 urges rollers 26 against these fingers, causing the elements 22 to swing outwardly on pins 21, and lifting the arms 14 from the full line to the chain-dotted positions, shown in Figure 2. This lifts the bead-stitching mechanisms 13 into operative bead-stitching relation at the sides of drum 10. The arrangement and shape of the elements 22 preferably is such that when the plunger-rod 28 has made a full downward stroke the ends of fingers 22ᶜ will be in engagement with opposite sides of rollers 26.

The bead-stitching mechanism 13 will be described in connection with the turn-up stitching operation, in which the usual fabric plies are stitched outwardly about the beads 33. However, it is to be understood that with slight alterations in the stitching tools, the stitching mechanism 13 could be used for other stitching operaations, such as the ply turn-down operation.

As best illustrated in Figures 5 to 9 inclusive, there may be adjustably secured at the end of each arm 14 a cylinder-supporting frame 34. Frame 34, which includes a bottom plate 35 maintained in spaced relation to the bottom of arm 14 by means of end blocks 36 and 37, may be clamped at one end to arm 14 by means of a bar 38 bolted over arm 14 to the block 37, and at the other end by means of flanges 39, 39, of a fluid pressure cylinder 40, similarly bolted to block 36. The arrangement is such that the frame 34, carrying cylinder 40, readily may be adjusted on arm 14 for a wide range of drum widths, the arm 14 being adjustable to swing higher or lower to accommodate drums of different diameters by means of the adjusting screws 25 on elements 22.

Slidably mounted on arm 14 may be a crosshead 41, having a slide-plate 42 slidably dovetailed in a recess 43 on the top thereof. In normal inoperative position, best shown in Figures 2 and 5, cross-head 41 preferably is retained against block 36, by the yielding action of a compression spring 44 extending between a boss 45 on frame 34 and a lug 46 on the bottom of the cross-head. Spring 44 may be retained in position by a pin 47 threaded in boss 45 and slidably received through an opening in lug 46. A longitudinal slot 47ª is provided in plate 35 to accommodate pin 47 and to permit free movement of spring 44 and lug 46.

Slide-plate 42, for carrying a tool 48, normally may be yieldably retained in the relative position to cross-head 41 best shown in Figures 2, 5, and 7. A plate 49 secured across the inner end of recess 43 in cross-head 41 may have a pair of pins 50, 50, threaded therein for retaining coil springs 51, 51, between the plate and slide-plate 42, one end of the springs being received in bores 52 in the slide-plate. A headed stop-pin 53, threaded in slide-plate 42, may be slidably received through plate 49 to limit the outward movement of the slide-plate as urged by springs 51.

The cross-head 41 is adapted to carry a suitable tire-holding tool 55 which may be designed to perform the initial bead-stitching movement of the ply turn-up operation. Tool 55 preferably is in the form of a plow having a flange 56 arranged to be inserted, while drum 10 is rotated in a clockwise direction, between the first plies 32 and the reduced portion 10ª of drum 10, and having a flange 58 for turning the edge portions of the plies radially outward about the beads 33 as the drum continues to rotate. The tool 55 may be secured on the end of a rod 59, adjustable for longitudinal and rotational movement on the end of a rod 60 which extends downwardly at an angle to rod 59, rod 60 in turn being adjustably secured for longitudinal and rotational movement in a block 61 pivotally mounted at 62 between a pair of lugs 63, 63, on cross-head 41. A tension spring 64 may be connected between lugs 65 and 66 on cross-head 41 and block 61, respectively, for yieldably urging shouldered portions 61ª on block 61 against flat portions 63ª on the lugs 63, whereby the tool 55 and associated parts carrying it will swing about pivot 62 against the yielding action of the spring should the tool become fouled against any solid object, such as the edge of the drum 10.

A tool 48, carried by slide-plate 42, preferably is arranged to follow up the operation of tool 55 for stitching the edge portions of the plies 32 inwardly about the bead 33, substantially as shown in Figure 8. For this purpose, tool 48 may comprise a roller or disc, rotatably secured on a pin 68 threaded into slide-plate 42, adapted to be moved toward the drum to catch the portions of the plies 32 turned outwardly by tool 55 and to turn the same inwardly about the bead 33.

For moving the tools 55 and 48 into beadstitching relation to drum 10, a piston rod 69 secured to slide-plate 42 has on the outer end thereof a piston 69ª operable by fluid pressure applied in cylinder 40 through conduit 70. When the movable parts of mechanism 13 are in the relative positions shown in Figure 5, with arms 14 in the chain-dotted positions of Figure 2, piston 69ª is operated initially to move slideplate 42 and cross-head 41 together in their original relative positions inwardly toward drum 10, the cross-head being urged against the yielding pressure of spring 44. During this time springs 51 hold in original relative position the slide-plate and cross-head, and consequently the tools thereon. When these parts have been moved to the position shown in Figure 7, stopplate 49 on cross-head 41 will engage bar 38 to limit the movement of the cross-head, while slide-plate 42 continues to be yieldingly urged by piston 69ª, against the action of springs 51, until it abuts stop-plate 49, as shown in Figure 8.

For controlling the bead-stitching mechanisms 13 and lever-operating mechanism 15 in proper sequence, a three-way valve 71, secured to plate 16 of the lever-operating mechanism (see Figures 2 and 3), may be provided. A supply line 72, from a suitable source of fluid pressure, may lead into the top of cylinder 29 and to an inlet port (not shown) in valve 71, said inlet port preferably being normally closed, until the arms 14 reach their upper positions, indicated in Figure 2. When the cycle of operation of the apparatus is started, as by an operator actuating a control device (not shown), to supply pressure to supply line 72, the fluid flows through pipe connection 73 to the top of cylinder 29, thereby causing the arms 14 to be lifted to the chain-dotted positions shown in Figure 2. As the arms 14 reach the last named position, an extension 27ª of pin 27 depresses a pin or button 74, against yielding action of a spring (not shown), to open valve 71, thereby permitting flow of pressure fluid through pipe connection 75 to the valve 71, and thence through conduits 76, and 70 to the respective cylinders 40. This applies pressure to the inner faces of pistons 69ª to start the operation of bead-stitching mechanism 13, as previously described.

In the operation of the apparatus for the purpose described, an operator first forms two or more layers of fabric plies on the drum 10 in the usual manner and places a pair of beads 33, with the flippers 33ª extending inwardly, against the shoulders of the drum. Next, the operator, through control device (not shown), actuates piston-rod 28 in cylinder 29, to move rollers 26 downwardly against fingers 22ᶜ, thereby causing arms 14 to swing upwardly on their pivots 21 until the piston has reached the end of its stroke, when the ends of the fingers will be engaged on opposite sides of the rollers, substantially as shown in chain-dotted lines in Figure 2.

When the arms 14 have reached the position shown in chain-dotted lines in Figure 2, the extension 27ª on pin 27 will yieldably urge pin 74, of the normally closed valve 71, inwardly to supply pressure-fluid to the cylinders 40, 40. This causes cross-heads 41, 41, and slide-plates 42, 42, to be moved toward drum 10, until tool or plow 55 yieldingly engages under the edges of the plies 32, drum 10 meanwhile being rotated in clockwise direction, thereby to turn the marginal portions of the plies outwardly about the beads during the initial movement of cross-head 41. At this point cross-head 41, preferably moving relatively slowly, will have reached the limit of its stroke by engaging plate 38 on frame 16.

Continued movement of piston 69$^a$ causes slide-plate 42 to be slidably moved in cross-head 41, against the yielding action of springs 51, until roller 48 engages the outwardly turned portions of the fabric plies 32, and turns the same inwardly about the bead, substantially in the manner illustrated in Figures 8 and 9. Hence the above described mechanism providing delayed action from slide-plate 42 to cross-head 41 is in the nature of a lost-motion device.

When the ply turn-up operation, just described, has been completed, the operator, by means of the control device (not shown), may release the pressure at the top of cylinder 29, at the same time applying pressure at the bottom thereof through a conduit 78. This raises the piston-rod 28 to permit fingers 22$^c$ to move inwardly under rollers 26, thereby allowing arms 14 to drop by gravity back to the full line positions shown in Figures 2 and 4. In the initial upward movement of extension 27$^a$, on pin 27, the pin 74 on valve 71 is released to exhaust the pressure fluid in cylinder 40, thereby allowing the slide-plate 42 and cross-head 41 to be yieldably urged, by springs 51, 51, and 44, respectively, from the relative positions shown in Figure 7 to the positions best shown in Figures 2 and 5.

It is readily understood that the apparatus may, with slight alterations, be utilized for performing other operations in the fabricating of a tire carcass. For example the ply "turn down" step, in which the marginal portions of fabric plies (not shown) are stitched over and under the bead, may be performed either by changing the shape of tool 55, or by arranging a similar tool on the opposite side of cross-head 41, the drum 10 in any case being rotated in the proper direction to obtain the desired results.

Modifications of the invention may be resorted to without departing from the spirit thereof or the scope of the appended claims.

What is claimed is:

1. Tire-building apparatus comprising a rotatable tire-building drum, a tire-building tool support associated with the tire-building drum, a member shiftably mounted on said support, an element shiftably mounted on said member, tire-building tools on said member and on said element, means including a stop member on said support for limiting shifting movement of said member thereon, means for limiting the relative movement of said member and said element, yielding means for retaining said member and said element against relative movement, and means for urging said member and said element toward said drum until said member engages said stop member, thereby initially to move the tool on said member into tire-working engagement with a tire being built on said drum, whereby continued movement of said urging means yieldably moves said element relatively of said member to urge said tool on said element into tire-building engagement with said tire being built on said drum.

2. Tire-building apparatus comprising a rotatable tire-building drum, a supporting frame, an arm pivotally mounted on said frame, means for swinging said arm to and from tire-building association with said drum, a member slidably mounted on said arm, an element slidably mounted on said member, tire-building tools on said member and on said element, means including a stop member on said arm for limiting movement of said member thereon, means for limiting the relative movement of said member and said element, yielding means for retaining said member and said element against relative movement, and means for urging said member and said element toward said drum until said member engages said stop member, thereby initially to move the tool on said member into tire-building engagement with said drum, and whereby continued movement of said urging means yieldably moves said element relatively of said member to urge the tool on said element into tire-building engagement with a tire being built on said drum.

3. Tire-building apparatus comprising a rotatable tire-building drum, a supporting frame, arms pivotally mounted on said frame, fabric-stitching mechanisms carried on the free ends of said arms, means for swinging said arms to move said mechanisms into oppositely disposed operative positions adjacent said drum from points remote therefrom, said mechanisms including members slidably carried on said arms, elements slidably mounted on said members, fabric-stitching tools on said members and on said elements, means including a stop member on said arms for limiting movement of said members thereon, means for limiting relative movement of said members and said elements, yielding means for normally retaining said members and said elements against relative movement with each other, and means initiated by movement of said arm-swinging means for urging said members and said elements toward said drum until said members engage said stop members, thereby initially to move the tools on said members into tire-building engagement with a tire being built on said drum to perform one part of a fabric-stitching operation, and whereby continued movement of said urging means yieldably urges said elements to move the tools thereon into tire-building engagement with said tire to perform another stitching operation.

4. Tire-building apparatus comprising a rotatable tire-building drum, a supporting frame, outwardly extending arms pivotally mounted on said frame, tire-building devices on the free ends of said arms, outwardly extending elements engaged under and carrying said arms and pivotally mounted on the frame, inwardly extending fingers on said elements, reciprocable means for engaging said fingers to swing said elements whereby to swing said arms on their pivots to move said devices to and from oppositely disposed operative positions adjacent a tire-building drum, and means operable by movement of said arms for urging said devices into operative engagement with said drum.

5. Tire-building apparatus comprising a rotatable tire-building drum, a support, a member movable on said support, an element relatively movable on said member, a stop on said support, yielding means normally retaining said member and said element against relative movement, a plow tool supported on said member, a disc tool supported on said element, and means for urging said member and said element toward a tire structure being built on said drum, the movement of said member being limited by said stop, whereby as said drum is rotated said member is moved initially to stitch the marginal portions of plies of said tire structure outwardly about the tire bead, and whereby continued movement of said urging means yieldably moves said element to urge said disc to stitch said marginal portions inwardly about said beads.

6. Tire-building apparatus comprising a rotatable tire-building drum, a tire-building tool support in association with said drum, a member shiftably mounted on said support, an element mounted on said support to be shiftable relative thereto and shiftable relative to said member, tire-building tools on said member and on said element, means for limiting movement of said shiftable member on said support, yieldable means for retaining said member and said element against relative movement, and means for urging said member and said element toward said drum until the member engages said limiting means, thereby initially to move the tool on said member into tire-building engagement with a tire being built on said drum, whereby continued operation of said urging means thereafter yieldingly shifts said element relative to said member to move the tool thereon into tire-building engagement with said tire on said drum.

7. Tire-building apparatus comprising a rotatable tire-building drum, a tire-building tool support in association with said drum, a member shiftably mounted on said support, an element mounted on said support to be shiftable relative thereto and shiftable relative to said member, tire-building tools on said member and on said element, lost-motion means connecting said member to said element for transmitting movement of one to the other, and means for urging said member and element toward said drum whereupon by reason of said lost-motion means initially to shift said member to move the tool thereon into tire-building engagement with a tire being built on said drum and thereafter upon continued operation of said urging means to shift said element to move the tool thereon into tire-building engagement with said tire on the drum.

8. Tire-building apparatus comprising a rotatable tire-building drum, a tire-building tool support shiftably mounted in association with said drum, power means operable for shifting said support toward and from said drum, a member shiftably mounted on said support, an element mounted on said support to be shiftable relative thereto and shiftable relative to said member, tire-building tools on said member and on said element, lost-motion means connecting said member to said element for transmitting movement of one to the other, means for urging said member and element toward said drum whereupon by reason of said lost-motion means initially to shift said member to move the tool thereon into tire-building engagement with a tire being built on said drum and thereafter upon continued operation of said urging means to shift said element to move the tool thereon into tire-building engagement with said tire on the drum, and means operable by shifting of said support toward said drum by said power means for actuating said urging means.

FLORAIN J. SHOOK.